United States Patent
Sexton et al.

(10) Patent No.: US 7,246,142 B2
(45) Date of Patent: Jul. 17, 2007

(54) METHOD FOR SCANNING DISCONTIGUOUS OBJECTS

(75) Inventors: Harlan Sexton, Palo Alto, CA (US); David Unietis, San Francisco, CA (US); Peter Benson, Boulder, UT (US)

(73) Assignee: Oracle International Corporation, Redwood Shores, CA (US)

( * ) Notice: Subject to any disclaimer, the term of this patent is extended or adjusted under 35 U.S.C. 154(b) by 689 days.

(21) Appl. No.: 10/434,452

(22) Filed: May 8, 2003

(65) Prior Publication Data

US 2003/0220931 A1 Nov. 27, 2003

Related U.S. Application Data

(60) Provisional application No. 60/378,391, filed on May 8, 2002.

(51) Int. Cl.
G06F 17/30 (2006.01)
(52) U.S. Cl. ............. 707/206; 707/100; 707/102; 707/104.1; 707/205
(58) Field of Classification Search ............ 707/100, 707/102, 104.1, 205, 206
See application file for complete search history.

(56) References Cited

U.S. PATENT DOCUMENTS 5,088,036 A * 2/1992 Ellis et al. ............ 707/206
5,732,257 A * 3/1998 Atkinson et al. ............ 707/4
5,799,309 A * 8/1998 Srinivasan ............ 707/102
5,946,696 A * 8/1999 Young ............ 707/104.1
6,144,968 A * 11/2000 Zellweger ............ 707/104.1
6,314,436 B1 * 11/2001 Houldsworth ............ 707/206
6,434,576 B1 * 8/2002 Garthwaite ............ 707/206
6,434,685 B1 8/2002 Sexton et al.
6,457,019 B1 9/2002 Sexton et al.
6,499,095 B1 12/2002 Sexton et al.
6,564,223 B1 5/2003 Sexton et al.
6,567,905 B2 * 5/2003 Otis ............ 711/170
6,934,726 B2 * 8/2005 Sokolov et al. ............ 707/206

OTHER PUBLICATIONS

Shivers, "Supporting Dynamic Languages on the Java Virtual Machine", Apr. 1996, <http://www.-static.cc.gatech.edu/~shivers/papers/javaScheme.html>, pp. 1-5.*

* cited by examiner

*Primary Examiner*—Hung Q. Pham
(74) *Attorney, Agent, or Firm*—Hickman Palermo Truong & Becker LLP (57) ABSTRACT

A method for scanning objects as for garbage collection is described that employ an ancillary data structure to describe the format of an object. Specifically, the data structure lists which parts of the object are references and how large each part of the object is. Scanning the object can efficiently occur by stepping through the object and the data structure in parallel.

26 Claims, 5 Drawing Sheets

```
401: ACCESS
DESCRIPTION OF
OBJECT LAYOUT
      |
      v
403: GENERATE
REFERENCE CODE
STRUCTURE BASED ON
OBJECT LAYOUT
```

REFERENCE CODE ARRAY 500

| 501: REFERENCE TYPE | 503: INCREMENT VALUE |
|---|---|
| 505 — NO | 4 |
| 507 — POINTER | 4 |
| 509 — POINTER | 4 |
| 511 — POINTER | 4 |
| 513 — 0 | 0 |

METHOD FOR SCANNING DISCONTIGUOUS OBJECTS

RELATED APPLICATIONS

The present application claims the benefit of U.S. Provisional Patent Application Ser. No. 60/378,391 filed on May 8, 2002, the contents of which are hereby incorporated by reference.

FIELD OF THE INVENTION

The present invention relates to computer systems and more particularly to a method for scanning objects during garbage collection.

BACKGROUND OF THE INVENTION

Objects are entities that encapsulate data and, in some environments, operations and methods associated with the object. When an object is created, memory is allocated for the object, and when the object is no longer needed, that memory for the object is deallocated so that the memory can be reused for other purposes. In dynamic run-time environments, objects are allocated and deallocated throughout the life of program, and the memory management of such dynamic objects is crucial to the correctness and performance of dynamic run-time environments.

Many dynamic run-time environments create objects that last as long as the objects are being referenced by a program, and these objects are deallocated when they are no longer referenced through a procedure known as garbage collection. To determine which objects are still referenced and which objects are no longer referenced, many garbage collectors calculate a root set for all the objects such that the transitive closure of objects in the root set (i.e. the set of objects reachable from the object in the root set) contains all the live objects in a memory space. In order to calculate a transitive closure, it is important to determine all the objects that a particular object references. This operation is referred to as scanning the object, which involves visiting every field in the object to determine whether the field contains a reference to another object, and, if the field does indeed contain such a reference, scanning that other object.

In some operating systems or other runtime environments, objects can be discontiguous. These environments, in practice if not by design, limit the guaranteed size of contiguous virtual memory to a "page," typically about two or four kilobytes in size. This page-size limitation may occur, for example, on computer systems that permit objects to be allocated in a shared memory for access by different processes and even by different processors. If an object is larger than a page or if the object is larger than the available memory on a page, then one part of the object would have to be allocated on one page and part of the object would have to be allocated on another page. The possibility, that objects may be discontiguous, however, greatly complicates the scanning operation, yet for performance reasons it is vital to scan objects as fast as practicable.

Therefore, there is a need for scanning discontiguous objects efficiently for garbage collection.

SUMMARY OF THE INVENTION

This need and others are addressed by the present invention in which an ancillary data structure is constructed to describe the format of an object that is specifically designed to facilitate the scanning of objects for references, e.g. for use by a garbage collection. Specifically, the data structure lists which parts of the object are references and how large each part of the object is. Scanning the object can efficiently occur by stepping through the object and the data structure in parallel.

Accordingly, one aspect of the invention is directed to a method and software for scanning a discontiguous object that includes initializing a pointer or other cursor into a data structure that has entries that correspond to slots of the discontiguous object and specify whether the corresponding slots have a reference type. If the slot of the discontiguous object corresponding to the entry has a reference type, then a garbage collection or other operation on an object referenced by the slot is performed. In one embodiment, the entries in the data structure also indicate corresponding increment values to reach successive slots, in which a scan pointer or other cursor is first initialized to indicate a slot of the discontiguous object and later modified to indicate a successive slot based on the increment value corresponding to the slot.

Another aspect of the invention relates to a method and software for facilitating the scanning of an object by accessing a description of the object, in which the description indicates the slots object and corresponding types, at least one of which is a reference type. Then, a data structure is generated having entries corresponding to the slots, in which each of the entries indicate whether the corresponding slot has a reference type.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for scanning discontiguous objects for garbage collection are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Hardware Overview

Figure 1:
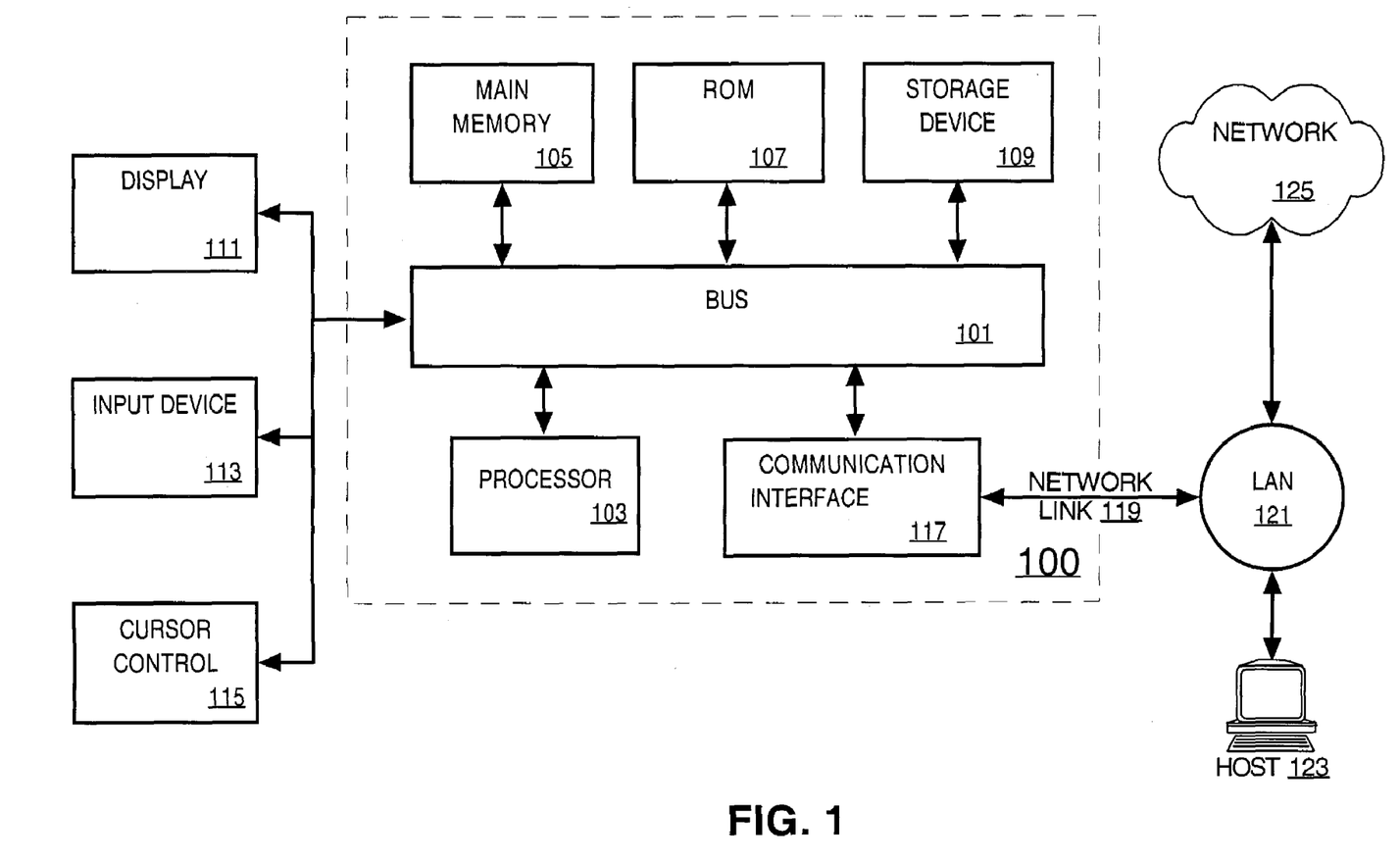
FIG. 1 depicts a computer system that can be used to implement an embodiment of the present invention.

FIG. 1 illustrates a computer system 100 upon which an embodiment according to the present invention can be implemented. The computer system 100 includes a bus 101 or other communication mechanism for communicating information and a processor 103 coupled to the bus 101 for processing information. The computer system 100 also includes main memory 105, such as a random access memory (RAM) or other dynamic storage device, coupled to the bus 101 for storing information and instructions to be executed by the processor 103. Main memory 105 can also be used for storing temporary variables or other intermediate information during execution of instructions by the processor 103. The computer system 100 may further include a read only memory (ROM) 107 or other static storage device coupled to the bus 101 for storing static information and instructions for the processor 103. A storage device 109, such as a magnetic disk or optical disk, is coupled to the bus 101 for persistently storing information and instructions.

The computer system 100 may be coupled via the bus 101 to a display 111, such as a cathode ray tube (CRT), liquid crystal display, active matrix display, or plasma display, for displaying information to a computer user. An input device 113, such as a keyboard including alphanumeric and other keys, is coupled to the bus 101 for communicating information and command selections to the processor 103. Another type of user input device is a cursor control 115, such as a mouse, a trackball, or cursor direction keys, for communicating direction information and command selections to the processor 103 and for controlling cursor movement on the display 111.

According to one embodiment of the invention, scanning discontiguous objects is provided by the computer system 100 in response to the processor 103 executing an arrangement of instructions contained in main memory 105. Such instructions can be read into main memory 105 from another computer-readable medium, such as the storage device 109. Execution of the arrangement of instructions contained in main memory 105 causes the processor 103 to perform the process steps described herein. One or more processors in a multi-processing arrangement may also be employed to execute the instructions contained in main memory 105. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 100 also includes a communication interface 117 coupled to bus 101. The communication interface 117 provides a two-way data communication coupling to a network link 119 connected to a local network 121. For example, the communication interface 117 may be a digital subscriber line (DSL) card or modem, an integrated services digital network (ISDN) card, a cable modem, a telephone modem, or any other communication interface to provide a data communication connection to a corresponding type of communication line. As another example, communication interface 117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 117 sends and receives electrical, electromagnetic, or optical signals that carry digital data streams representing various types of information. Further, the communication interface 117 can include peripheral interface devices, such as a Universal Serial Bus (USB) interface, a PCMCIA (Personal Computer Memory Card International Association) interface, etc. Although a single communication interface 117 is depicted in FIG. 1, multiple communication interfaces can also be employed.

The network link 119 typically provides data communication through one or more networks to other data devices. For example, the network link 119 may provide a connection through local network 121 to a host computer 123, which has connectivity to a network 125 (e.g. a wide area network (WAN) or the global packet data communication network now commonly referred to as the "Internet") or to data equipment operated by a service provider. The local network 121 and the network 125 both use electrical, electromagnetic, or optical signals to convey information and instructions. The signals through the various networks and the signals on the network link 119 and through the communication interface 117, which communicate digital data with the computer system 100, are exemplary forms of carrier waves bearing the information and instructions.

The computer system 100 can send messages and receive data, including program code, through the network(s), the network link 119, and the communication interface 117. In the Internet example, a server (not shown) might transmit requested code belonging to an application program for implementing an embodiment of the present invention through the network 125, the local network 121 and the communication interface 117. The processor 103 may execute the transmitted code while being received and/or store the code in the storage device 109, or other non-volatile storage for later execution. In this manner, the computer system 100 may obtain application code in the form of a carrier wave.

The term "computer-readable medium" as used herein refers to any medium that participates in providing instructions to the processor 105 for execution. Such a medium may take many forms, including but not limited to non-volatile media, volatile media, and transmission media. Non-volatile media include, for example, optical or magnetic disks, such as the storage device 109. Volatile media include dynamic memory, such as main memory 105. Transmission media include coaxial cables, copper wire and fiber optics, including the wires that comprise the bus 101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

"Virtual memory" refers to memory addressable by a storage allocation technique in which auxiliary storage, such as memory in storage device 109, can be addressed as though it were part of the main memory 105. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 105.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 103. In some embodiments, shared memory is also accessible to executing user processes on a plurality of processors.

"Secondary storage" as used herein refers to storage elements, other than virtual memory, accessible to a process. Secondary storage may be local or networked. Local secondary storage, furnished by storage device 109 on computer system 100, is preferably a random access storage device such as a magnetic or optical disk. Networked secondary storage is provided by storage devices on other computer systems, for example on the host 123 accessible over a local area network 121 or on a server accessible over a wide area network 125 such as the Internet.

Paged Memory System

Figure 2:
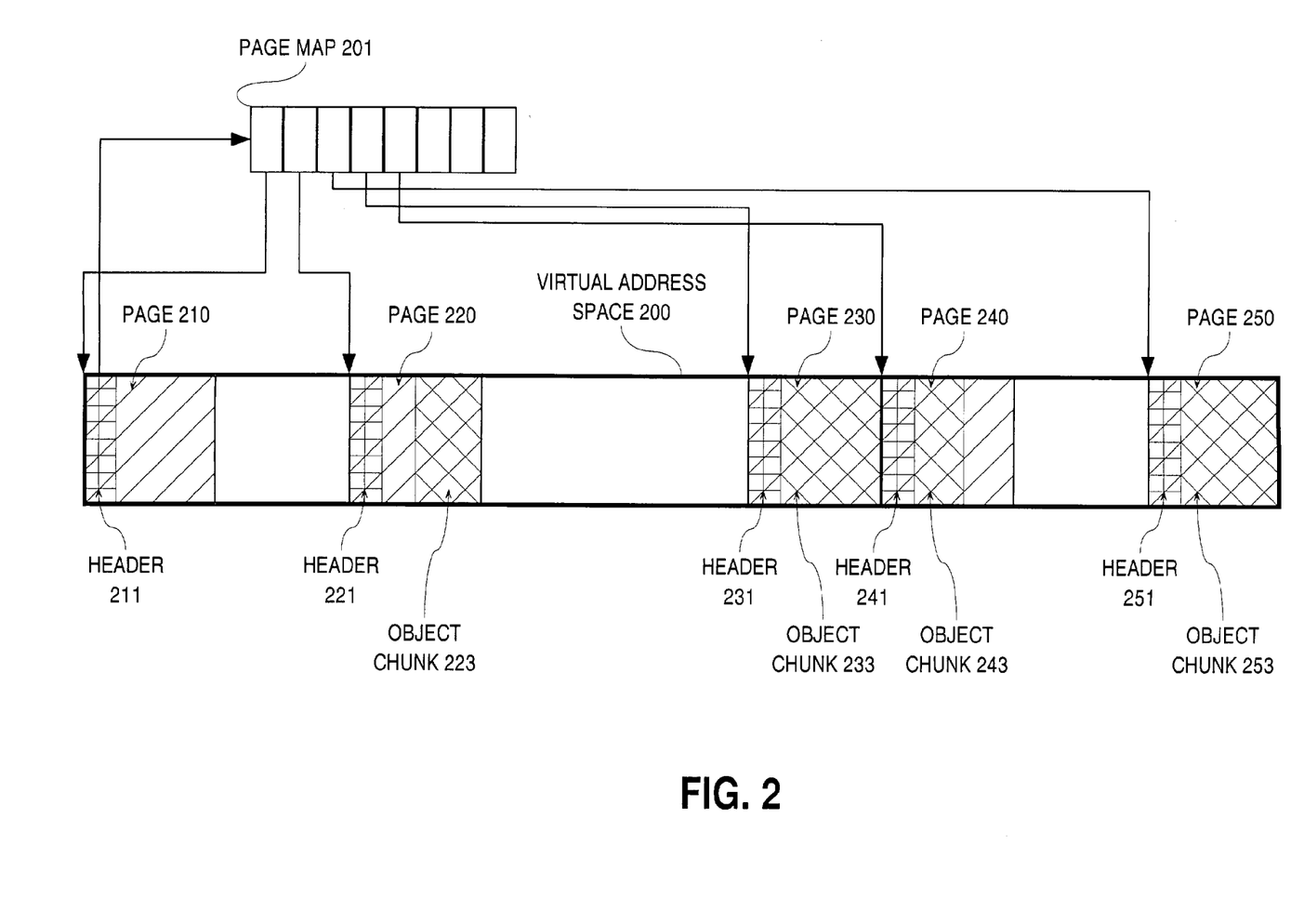
FIG. 2 is a schematic diagram of a paged memory management architecture in accordance with one embodiment of the present invention.

On many systems, it is useful to divide the program state into a plurality of fixed-size contiguous chunks of memory called "pages." A page is a moderately sized contiguous memory segment that is supported within the server environments, especially for shared memory. FIG. 2 depicts a portion of virtual address space 200 that includes a plurality of pages 210, 220, 230, 240, and 250. The page size is preferably compatible with those servers that severely restrict the size of contiguous memory segments. For example, the page size may be in the range of 256 B ($2^8$ bytes) to 64 kB ($2^{16}$ bytes), such as 4 kB ($2^{12}$ bytes) or 8 kB ($2^{13}$ bytes). For purposes of illustration, the following discussion will refer to 4 kB pages in an exemplary embodiment, in which the pages themselves are aligned on 4 kB boundaries.

To access the various pages of the virtual memory, a page map is maintained to keep track of the pages. Each page is assigned a logical page number, which is used to index the page map to fetch the virtual address of the beginning of the page, called a page address. For example, a page map 201, which in one embodiment is stored in page #0 (210), contains entries storing page addresses of the pages of the virtual address space 200. The logical order of the pages in the page map 201 may be different from the physical order of the pages in the virtual address space 200. For example, the physical order of the pages is pages 210, 220, 230, 240, and 250, but the logical order of the pages as indicated by the page map 201 is 210, 220, 250, 230, and 240.

A certain amount of space, called a "page header," is reserved at the beginning of each page to store useful information for the memory management of the page, including the logical page number, the address of the page map, and the base address of the object memory (page address for page 0). For example, each of the pages 210, 220, 230, 240, and 250 contain a page header 211, 221, 231, 241, and 251. The size of the header can be padded out to a power of two. For example, if normally the page header would be 120 bytes of information, the page header may be padded with an extra 8 bytes to reserve of a total of 128 bytes, which is $2^7$.

FIG. 2 also depicts a paged object that is too large to fit in any single page, and, in fact, is allocated on four pages 220, 230, 240, and 250 in four respective chunks 223, 233, 243, and 253. The first chunk 223 of the paged object is located at an address on page 220. The next chunk 253 of the paged object consumes the entire usable memory of page 250, which is logically the next page after page 220 according to the page map 201. The third and fourth chucks 233 and 243 of the page are located on pages 230 and 240, respectively.

In one paged memory system, objects are composed of a series of 4-byte or 8-byte slots, logically ordered in an ascending sequence. Each slot is located at a logical displacement from the beginning of the object. In the virtual address space, each slot is located on one of the object's pages at a "page offset" from the beginning of the page. On the first page allocated for the object, the logical displacement of the slot is equal to the page offset of the slot minus the page offset of the beginning of the object. For example, if the beginning of the paged object is located at page offset 0x0800 (2048) and the page size is 4 kB (4096 bytes), then logical displacements in the range 0x0000 to 0x07FA correspond to page offsets in the range 0x0800 to 0x0FFA. Thus, for a slot on the first chunk 223 of an object, there is a straightforward numerical relationship between the logical displacement of the slot and the page offset of the slot.

For slots on subsequent pages, however, the relationship is more complicated, because the addresses of the slots are no longer contiguous. The pages themselves need not be contiguous, and each page may include a page header that is reserved for administrative information. For example, if the logical displacement of a slot of an object is large enough to extend 32 bytes past the end of the first page 220, then the page offset of the slot is 32 bytes past the page header 251 of the next page 250. If the page header 251 is 128 bytes long, then the page offset of that slot is at 128+32=160 bytes from the beginning of page 250. Each time the logical displacement results in a page boundary being crossed, the logical page number is increased and the accumulated page offset is increased by the size of the page header.

Meta-Object System

To foster portability, a meta-object system and code generation facility is provided to automatically generate appropriate high-level language instructions for laying out, accessing, and modifying the slots of the object based on platform-specific descriptions of primitive types. For example, the meta-object system and code generation facility can generate C programming language macros, C++ inline functions, or other kinds of subroutines, procedures, and functions appropriate to the high-level language compiler for the different platforms. In addition, some embodiments of a meta-object system and code generation facility can generate appropriate high-level language instructions for implementing generic functions in support of method dispatching.

Figure 3:
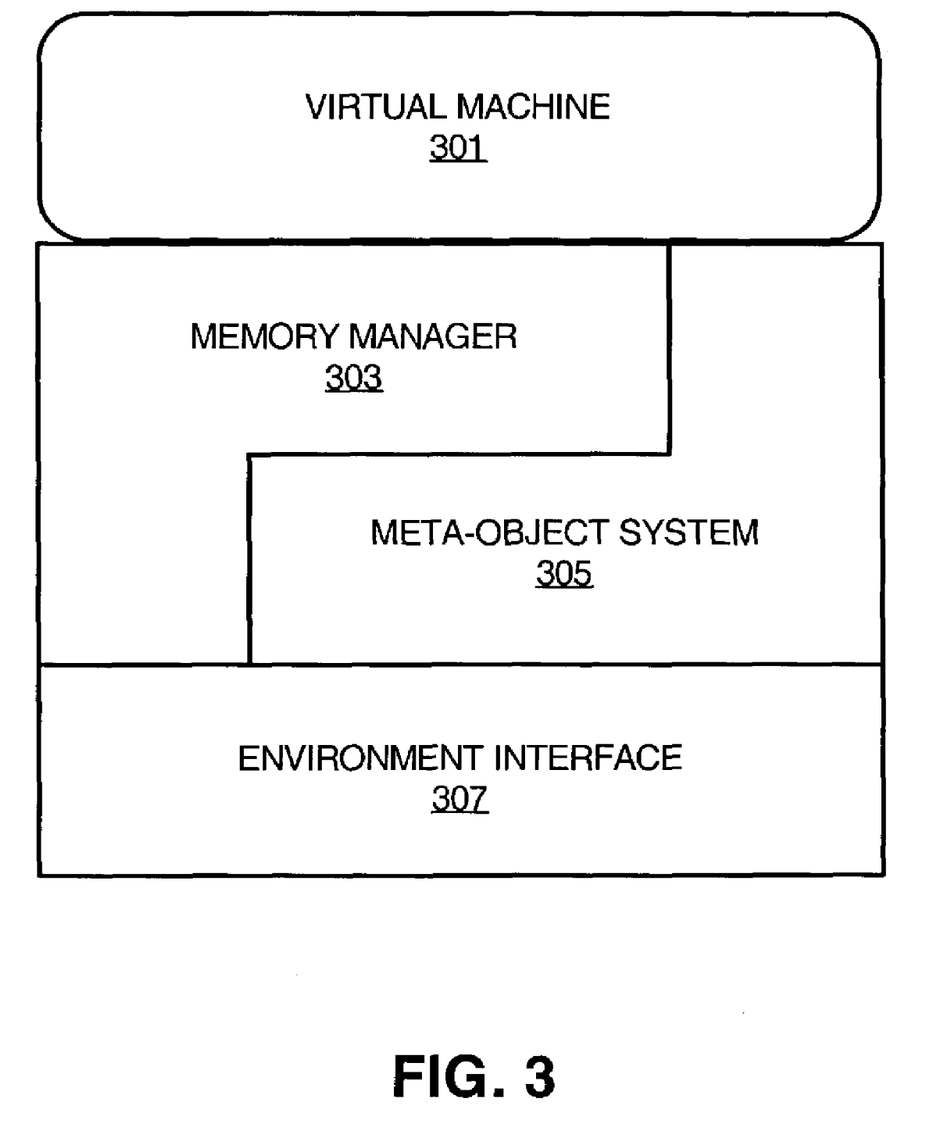
FIG. 3 is a conceptual diagram of a run-time environment in accordance with one embodiment of the present invention.

Referring to FIG. 3, depicted is a conceptual diagram of a run-time environment comprising a virtual machine 301, memory manager 303, a meta-object system 305, and an environmental interface 307 and their interrelationships. The bottom layer, the environment interface 307, insulates the run-time environment from the "outside" world as by providing an encapsulation and interface to operating system calls. The memory manager 303 and the meta-object system 307 together provide a foundation on which the rest of the virtual machine 301 is implemented. The virtual machine 301, for example, can be a JAVA™ virtual machine. The area of overlap between the memory manager 303 and the meta-object system 305 is reflected in the reference model used by objects in the virtual machine 301.

For example, the reference model can require short objects to be allocated contiguously for reasons of efficiency, but larger objects to be allocated on various pages for flexibility. In the addition, the reference model can specify the formats of objects that may depend on different memory spaces used for garbage collection. For tenuring garbage collector, object may be allowed within different memory spaces that correspond to different lifetimes, e.g. call-duration memory and session-duration memory. Accordingly, the memory manager 303 and the meta-object system 305 serve to cooperate in allocating, deallocating, and migrating objects to the appropriate memory space.

To facilitate this cooperation, the designer of the meta-object system 305 decides which types are supported and what their representations should be, and then defines the layout of objects using the primitive types and compositions of the primitive types. In one implementation, for example, the following primitive types may be defined: integer types (e.g. one, two, four, and eight-byte signed and unsigned integers), floating point types (e.g. single and double precision IEEE standard floating point numbers), character types (e.g. one, two, and four byte characters), object reference types (e.g. in native machine pointer and numeric reference formats), foreign pointer data types (used, e.g. to reserve space for caching a pointer value strictly during runtime in an otherwise platform-independent format object), Boolean types, and derived types (e.g. a header type derived from an unsigned four-byte integer and a length type to hold the length of variable length objects, also derived from an unsigned four-byte).

In addition, the representations of these types are also specified by the designer. For example, a "ub4" (four-byte unsigned integer) can be specified to hold exactly four bytes. As another example, a single float can specified in accordance with the IEEE standards. Generally, the alignment and space restrictions of the most restrictive supported platforms are taken into account. For example, if 64-bit machines such as the Cray YP-1 are to be supported, then the format should reserve at least 8 bytes for the foreign pointer value.

After the primitive types and their representations have been decided, the implementer then defines the layout of objects used to implement the virtual machine 301. In one embodiment, a Scheme-like language is used to define classes of objects and their superclasses, but other syntactical notations may also be used. Like other object-oriented languages, specifying the name of the superclass provides for inheritance. For example, an implementer may define a class of binary tree nodes as a subclass of a root eobject class as follows:

```
(define-object eotnode
    (super eobject)
    (desc "a binary tree node")
    (slots (left eoref) (right eoref) (data eoref)))
```

In this definition, a binary tree node is specified by the (super <object>) option as being derived from the eobject superclass and as containing the three slots, all which are references. Pursuant to the inheritance property of object-oriented programming languages, all generic functions that are applicable to the eobject superclass and that are not overridden by the eotnode subclass are available to objects of the eotnode subclass. For example, an eosize generic function might be defined to return the size of the object. If a class-specific eosize function has not been defined for the eotnode type, then the eosize function for the eobject type would be used. When an object is defined, the object is assigned a type code that is stored in the header of the object to identify the type of the object.

Based on this definition of the object, a layout in a high-level language for the defined object can be generated. In particular, each slot is laid out with the size and alignment previously defined for the types of the slots. In addition, the layout for the defined object can be done both in native format (e.g. pointers) and platform-independent format (e.g. numeric references). For example, a native format layout in the C programming language may be as follows:

```
struct eotnode_ptr
{
    ub4 hdr;        // with: typedef unsigned int ub4;
    eobject* left;
    eobject* right;
    eobject* data;
}
```

However, the same object may be laid out for platform-independent format on a typical 32-bit machine as follows, wherein a numeric reference is defined to be four bytes:

```
struct eotnode_nref
{
    ub4 hdr;      // with: typedef unsigned int ub4;
    ub4 left;
    ub4 right;
    ub4 data;
}
```

Numeric references are described in greater detail in the following commonly-assigned patents and co-pending patent applications, the contents of which are hereby incorporated by reference as if fully set forth within: U.S. Pat. No. 6,499,095 entitled MACHINE INDEPENDENT MEMORY MANAGEMENT SYSTEM WITHIN A RUN-TIME ENVIRONMENT in re Sexton et al.; U.S. Pat. No. 6,434,685 entitled PAGED MEMORY MANAGEMENT SYSTEM WITHIN A RUN-TIME ENVIRONMENT in re Sexton et al.; and U.S. patent application Ser. No. 09/408,847 entitled METHOD AND ARTICLE FOR MANAGING REFERENCES TO EXTERNAL OBJECTS IN A RUN-TIME ENVIRONMENT in re Sexton et al.

Reference Code Structure

Figure 4:
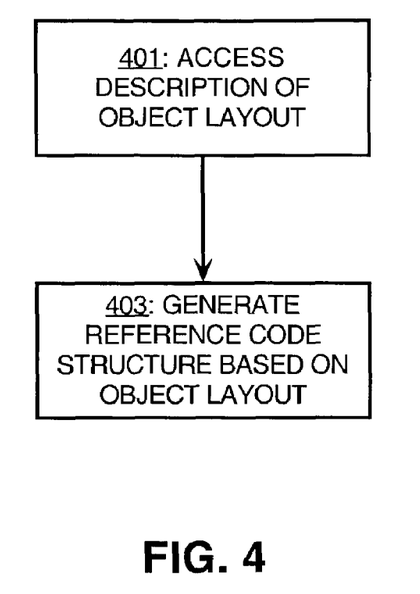
FIG. 4 illustrates the operation of generating an ancillary data structure in accordance with one embodiment.

In accordance with one aspect of the invention, the meta-object system is used, not only to generate object layouts, but also to generate an ancillary data structure, referred to herein as a reference code structure, to facilitate the scanning of objects during garbage collection. The operation of generating such a data structure, in accordance with one embodiment of the presented is illustrated in FIG. 4. Specifically, the description of an object as defined in the meta-object system is accessed to determine what the layout of the object is, e.g. the sequence and contents of the slots of the objects (step 401). Based on this description of the object, a reference code data structure is generated to encapsulate the information sufficient to scan the object during garbage collection (step 403). This data structure is then used during garbage collection to step through the slots of the object, determining whether the slot reference other objects and, if so, performing garbage collection operations on the referenced objects.

Figure 5:
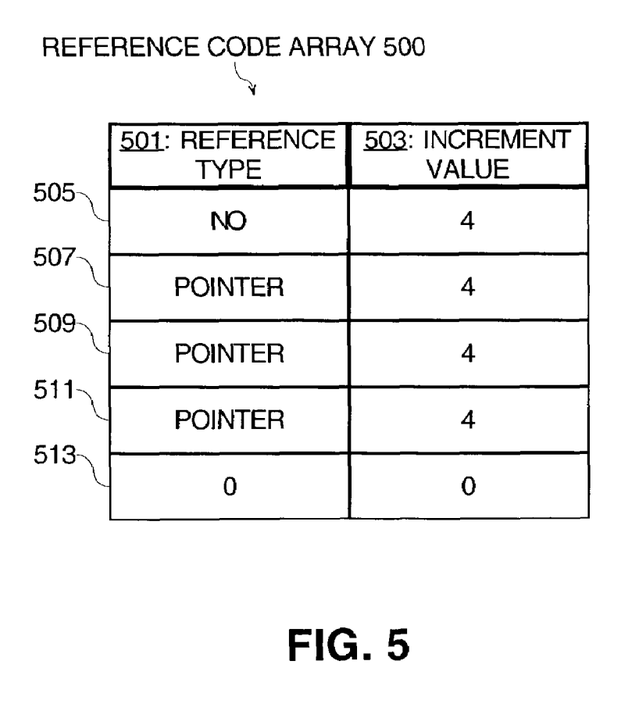
FIG. 5 depicts an exemplary reference code data structure used to illustrate the operation of one embodiment of the present invention.

FIG. 5 depicts an exemplary reference code data structure, corresponding for purposes of illustration to an object of type eotnode as defined above, implemented as a reference code array 500 in accordance with one embodiment of the present invention. Although an array implementation of the reference code data structure is described herein and may be preferred for performance reasons, the present invention is not so limited and other data structures can be used.

In one embodiment, the reference code array 500 contains a set of entries 505, 507, 509, and 511, each entry corresponding a respective slot in an eotnode object. For ease of implementation, only the slots explicitly defined in the eotnode definition are shown; however, if the superclass of the object type also requires slots, those slots may be included as well. In the example, entry 505 corresponds to a slot for the header of the object, entry 507 corresponds to a slot for the left child, entry 509 corresponds to a slot for the right child, and entry 511 corresponds to a slot for the data that the node stores. The final entry 513 is a sentinel that corresponds to the end of the object.

In addition, each entry 505, 507, 509, and 511 records information relating to scanning objects in two fields: a reference type field 501 that specifies whether the slot has a reference type and an increment value field 503 that specifies the size of the slot. In the example, the header word is not a reference, so the reference type field 501 for the corresponding entry 505 has a value of NO for the reference type. On the other hand, the left, right, and data slots do indeed have a reference type, so the reference type field 501 for the corresponding entries 507, 509, and 511 has a value of POINTER for the reference type. The sentinel entry 513, being used to indicate the end of the object, holds values that specify that there are no more slots in the object, e.g. by a zero (0) increment value.

The exact values of NO and POINTER for the reference type field 501 depend on the implementation and whether it is desirable to discriminate among a plurality of different reference types. If there are only two such values, then the reference type field 501 can consist of a single bit with, for example, a 0 bit meaning NO and a 1 bit meaning POINTER. In the example, the increment value field 503 for each of the entries 505, 507, 509, and 511 is four (4), indicating that each of the corresponding slots in the object are 4-bytes or 32-bits wide; however, if the corresponding slots have other types, e.g. a double precision floating point number, the increment value field 503 may differ. In some implementations, the increment value in the increment value field 503 may be compressed, for example, by dividing by two or four to exploit alignment restrictions imposed on the slots.

In one embodiment, the reference type field 501 and the increment value field 503 consists of only the information needed to scan an object during garbage collection. Therefore, the size of the reference code array 500 can be kept as small as possible. In fact, it is possible to implement each entry 505, 507, 509, and 511 of the reference code array 500 as a single machine word, with one bit (e.g. either the most significant or the least significant) use to encode the reference type field 501 and the remaining bits to encode the value of the increment value 503. When each entry of the reference code array 500 is a machine word, the data structure can be traversed quickly using pointer increment machine language structures.

Another way to foster efficiency is to require the reference code array 500 to be stored in contiguous memory (at least in the virtual address space) to avoid the overhead associated with discontiguities. Other implementation variations are also possible. For example, it is even possible to provide entries only for the reference slots in the objects, thereby ignoring the non-reference slots (e.g. integers, floating point numbers, etc.). In this variation, the increment value field 503 indicates the displacement to the next reference slot in the object, and the reference type field 501 need not be present because the entries in the reference code array 500 of this variation only correspond to slots that have a reference type.

Scanning Discontiguous Objects

Figure 6:
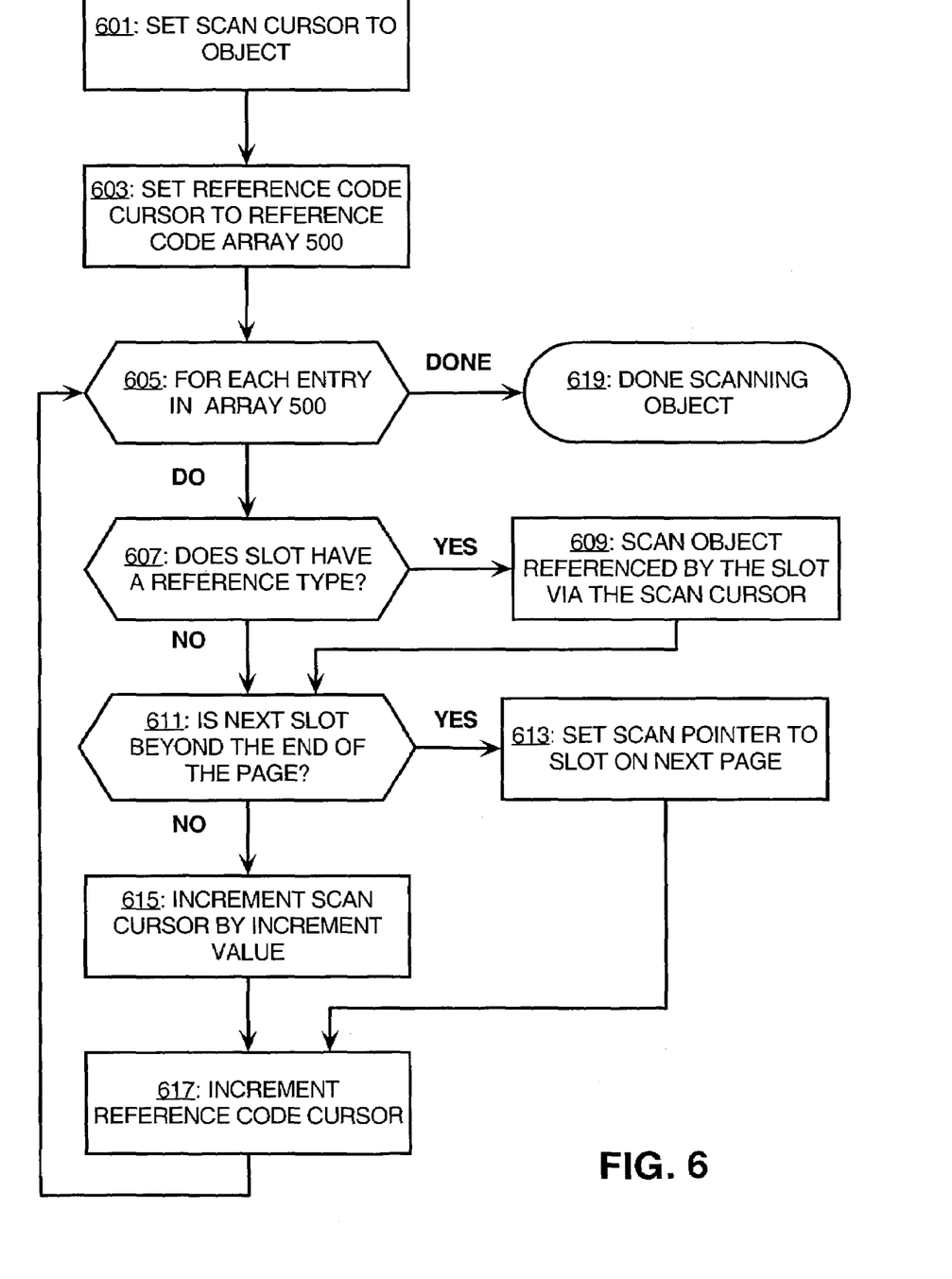
FIG. 6 is a flow chart that illustrated a process of scanning a discontiguous object for garbage collection according to one embodiment of the present invention.

After a reference code data structure has been created for an object type (FIG. 4, step 403), objects that type can be scanned efficiently during garbage collection. FIG. 6 is a flow chart illustrating the operation of one embodiment of the present invention for scanning an object during garbage collection.

At step 601, a scan cursor is set to point to the beginning of the object immediately past the header of the object. As used herein, a "cursor" is any kind of value useful for traversing a data structure, such as the reference code data structure generated in step 403. For efficiency reasons, a preferred implementation for a scan cursor is a machine pointer, which contains the virtual memory address (on virtual memory systems) or real memory address of the object; however, the present invention is not limited to the use of machine pointers. For example, other implementation of a scan can be used, such as an integer index in to the reference code array or a numeric reference. If the scan cursor is implemented by a tagged reference (see, e.g., U.S. Pat. No. 6,457,019 entitled MEMORY MANAGEMENT WITHIN A RUN-TIME ENVIRONMENT in re Sexton et al., the contents of which are incorporated by reference in their entirety), then the scan cursors is preferably implemented by a detagged version of the tagged reference. Detagging a tagged reference can be performed by masking off the tag bits.

In the pointer implementation for the scan cursor, it is also helpful to set a pointer (referred to herein an "end pointer") to one address beyond the end of the current page on which the object is located. For example, with reference to FIG. 2, if the first page of the object is page 220, then end pointer is set to the beginning of the next physical page, which is adjacent to and contiguous to page 220. Initializing the end pointer can be performed by arithmetic on the value of the scan pointer, for example, by endptr=(scanptr+(PAGSIZ −1)) & ~(PAGSIZ −1);

where endptr is the end pointer, scanptr is the scan pointer, and PAGSIZ is the size of the page in bytes.

Referring back to FIG. 6, at step 603, a reference code cursor is set to a position in the reference code array 500 that corresponds to the slot pointed to by the scan cursor. The reference code cursor can be implemented as a machine pointer, integer index, or numeric reference. If the reference code array 500 contains an entry for the object header (e.g. entry 505), then the reference code cursor is set to indicate the next entry (e.g. entry 507).

Block 605 controls a loop that iterates over each entry in the reference code array 500, in which steps 607-617 are performed in each iteration, and step 619 is performed when the loop terminates. In one implementation, termination of the loop is determined when a sentinel entry (e.g. entry 513 in reference code array 500) is reached; however, other looping conditions may be used, e.g., a for loop until the number of entries in the reference code array 500—if the number of entries in the reference code array 500 is being maintained. With the sentinel implementation, however, it is not necessary to maintain the number of entries in the reference code array 500.

Block 607 is a test that determines whether the current slot in the object has a reference type. This determination can be performed by accessing the reference type field 501 at the entry in the reference code array 500 that the reference code cursor is currently indicating. If the current slot in the object does indeed have a reference type, then execution branches to step 609 where a garbage collection operation is performed on the object referenced in the current slot (e.g. scanning the object, marking the object, migrating the object, etc.). In one implementation, the object referenced in the current slot is accessed through the scan cursor (e.g. by dereferencing a scan pointer) that is being maintained in parallel. After execution of step 609 or, on the other hand when the current slot in the object does not have a reference type, execution proceeds to step 611.

Steps 611-615 relate to maintenance of the scan cursor. Specifically, at step 611, the increment value 503 (after conversion to a data size in bytes if needed) is added to the scan pointer to determine if the sum goes beyond or exceeds the end of the page. If the sum does indeed exceed the end of the page, then the next page is determined, and scan pointer is set to the next slot of the object after making due allowance for the page header (step 613). After adjusting the scan pointer, a new end pointer is calculated by the arithmetic described above. This step handles discontiguous objects. Referring to FIG. 2 by way of example, if the scan pointer is to go beyond the end of the first page 220, then the page map 201 is consulted to determined the next logical page, which is page 250, and then to set the scan pointer immediately beyond the page header 251 of page 250 to the successive slot in the object at the beginning of object chunk 253. All these operations can be performed by an out-of-line subroutine call or by in-line code depending the characteristics of the implementation's instruction cache. If, on the other hand, the sum does not exceed the end of the page, the increment value 503 is simply added to increment the scan pointer (step 615).

After execution of steps 611-615, the reference code cursor is maintained to step in parallel with the scan cursor. This can be performed by incrementing the reference code cursor (step 617) by an appropriate value to cause the reference code cursor to indicate the successive entry in the reference code array 500. Execution then loops back to block 605 where another iteration through the loop is controlled.

Accordingly, a method of scanning objects is described in which almost every time around the loop, even for a discontiguous object, the overhead is the same as if the object could be completely scanned with the pointer arithmetic appropriate for a fully contiguous object. Furthermore, it is possible to enforce a minimum size for paged objects (that is, objects smaller than a fixed limit are guaranteed to be contiguous), thereby enabling the code generation of the meta-object system and the compiler to generate, for classes whose instances are known to be smaller than that limit, fast code to access and set the slots directly. In other words, in some cases, it is possible to avoid looping through the object altogether.

While the present invention has been described in connection with a number of embodiments and implementations, the present invention is not so limited but covers various obvious modifications and equivalent arrangements, which fall within the purview of the appended claims.

What is claimed is:

1. A method for scanning a discontiguous object, comprising:
   initializing a cursor into a data structure having a plurality of entries, wherein the data structure is separate from the discontiguous object, and wherein each entry of the plurality of entries corresponds to a slot in a plurality of slots of the discontiguous object and includes:
   a value that indicates whether the slot that corresponds to said each entry has a reference type, and
   an increment value that is used to access a successive slot of the plurality of slots that is successive to the slot that corresponds to said each entry;
   for each entry of the plurality of entries:
   determining whether said each entry of the data structure specifies whether a first slot of the plurality of slots of the discontiguous object has a reference type, wherein the first slot corresponds to said each entry;
   if the first slot of the discontiguous object corresponding to said each entry has a reference type, then performing an operation on an object referenced by the first slot;

accessing a second slot of the plurality of slots of the discontiguous object by using an increment value indicated by said each entry; and incrementing the cursor to a successive entry, in the data structure, that is successive to said each entry and that corresponds to the second slot.

2. A method according to claim 1, wherein using the increment value further comprises: initializing a scan cursor to indicate the first slot of the discontiguous object; and modifying the scan cursor to indicate the second slot based on the increment value of said each entry.

3. A method according to claim 2, wherein the scan cursor includes one of an integer index, a pointer, and a numeric reference.

4. A method according to claim 2, wherein performing an operation on the object referenced by the first slot includes: accessing the first slot by dereferencing the scan cursor.

5. A method according to claim 2, wherein:
the scan cursor includes a scan pointer;
the discontiguous object is disposed on at least first page and a second page other than the first page; and
modifying the scan pointer to indicate the second slot based on the increment value includes:
determining whether a sum of the increment value and the scan pointer exceeds the end of the first page;
if the sum of the increment value and the scan pointer exceeds the end of the first page, then setting the scan pointer to point to the second slot of the object disposed on the second page; and
if the sum of the increment value and the scan pointer does not exceed the end of the first page, then incrementing the scan pointer by the increment value.

6. A method according to claim 2, wherein each entry of the plurality of entries consists of a single machine word.

7. A method according to claim 1, wherein the data structure is stored contiguously in memory.

8. A method according to claim 1, wherein the cursor includes one of an integer index, a pointer, and a numeric reference.

9. A method according to claim 1, wherein the operation includes a garbage collection operation.

10. A computer storage medium bearing instructions for scanning a discontiguous object; said instruction being arranged, upon execution by one or more processors, to perform the method according to claim 1.

11. A computer storage medium bearing instructions for scanning a discontiguous object; said instruction being arranged, upon execution by one or more processors, to perform the method according to claim 2.

12. A computer storage medium bearing instructions for scanning a discontiguous object; said instruction being arranged, upon execution by one or more processors, to perform the method according to claim 3.

13. A computer storage medium bearing instructions for scanning a discontiguous object; said instruction being arranged, upon execution by one or more processors, to perform the method according to claim 4.

14. A computer storage medium bearing instructions for scanning a discontiguous object; said instruction being arranged, upon execution by one or more processors, to perform the method according to claim 5.

15. A computer storage medium bearing instructions for scanning a discontiguous object; said instruction being arranged, upon execution by one or more processors, to perform the method according to claim 6.

16. A computer storage medium bearing instructions for scanning a discontiguous object; said instruction being arranged, upon execution by one or more processors, to perform the method according to claim 7.

17. A computer storage medium bearing instructions for scanning a discontiguous object; said instruction being arranged, upon execution by one or more processors, to perform the method according to claim 8.

18. A computer storage medium bearing instructions for scanning a discontiguous object; said instruction being arranged, upon execution by one or more processors, to perform the method according to claim 9.

19. A method for facilitating scanning of an object, comprising:
instantiating said object, wherein said object comprises a plurality of slots;
accessing a description of the object, said description indicating said plurality of slots of said object and corresponding types, wherein at least one of the types is a reference type;
generating a data structure separate from said object having a plurality of entries, wherein:
each entry of the plurality of entries corresponds to a slot of the plurality of slots of said object,
each entry of the plurality of entries indicates whether the corresponding slot has a reference type, and
each entry indicates an increment value that is used to reach a successive slot that is successive to the corresponding slot; and
scanning said object by traversing each entry of the plurality of entries using the increment value of said each entry in the generated data structure to access a particular successive slot, of the plurality of slots, that is successive to the slot that corresponds to said each entry;
performing an operation on an object referenced by a particular slot, of the plurality of slots, if a particular entry that corresponds to the particular slot indicates that the particular slot has a reference type.

20. A method according to claim 19, wherein the operation includes a garbage collection operation.

21. A method according to claim 19, wherein each entry of the plurality of entries consists of a single machine word.

22. A method according to claim 19, wherein the data structure is stored contiguously in memory.

23. A computer storage medium bearing instructions for scanning an object, said instruction being arranged, upon execution by one or more processors, to perform the method according to claim 19.

24. A computer storage medium bearing instructions for scanning a discontiguous object; said instruction being arranged, upon execution by one or more processors, to perform the method according to claim 20.

25. A computer storage medium bearing instructions for scanning a discontiguous object; said instruction being arranged, upon execution by one or more processors, to perform the method according to claim 21.

26. A computer storage medium bearing instructions for scanning a discontiguous object; said instruction being arranged, upon execution by one or more processors, to perform the method according to claim 22.

* * * * *